United States Patent [19]
Hui et al.

[11] Patent Number: 5,756,602
[45] Date of Patent: May 26, 1998

[54] METHOD FOR CONTROLLING REACTION TEMPERATURE

[75] Inventors: Chi-Yai Hui; Hirofumi Inokuchi; Makoto Uramoto, all of Okayama, Japan

[73] Assignee: Mitsubishi Chemical Corporation, Tokyo, Japan

[21] Appl. No.: 588,306

[22] Filed: Jan. 18, 1996

[30] Foreign Application Priority Data

Jan. 24, 1995 [JP] Japan ................... 7-008923

[51] Int. Cl.⁶ ................... C08F 214/06
[52] U.S. Cl. ................... 526/61; 526/344.2; 526/345
[58] Field of Search ................... 526/61, 344.2, 526/345

[56] References Cited

U.S. PATENT DOCUMENTS 4,552,724  11/1985  Matsumoto et al. ................... 422/138

FOREIGN PATENT DOCUMENTS

| | | |
|---|---|---|
| 0 614 866 | 9/1994 | European Pat. Off. . |
| 0 659 475 | 6/1995 | European Pat. Off. . |
| 0 700 716 | 3/1996 | European Pat. Off. . |
| 2 214 707 | 8/1974 | France . |
| 2 256 177 | 7/1975 | France . |
| 2 353 574 | 12/1977 | France . |
| 2 473 902 | 7/1981 | France . |
| 41 05 404 | 8/1992 | Germany . |
| 60-4901 | 3/1985 | Japan . |
| 60-49011 | 3/1985 | Japan . |
| 4-141223 | 5/1992 | Japan . |
| 8-73508 | 3/1996 | Japan . |
| 8-100005 | 4/1996 | Japan . |
| 64 219 | 5/1972 | Luxembourg . |

*Primary Examiner*—Thomas R. Weber
*Attorney, Agent, or Firm*—Oblon, Spivak, McClelland, Maier & Neustadt, P.C.

[57] ABSTRACT

A method for controlling reaction temperature for a reaction vessel having a flow channel for a heat transfer medium for heating or cooling or both when vinyl chloride-based monomer is polymerized in an aqueous medium, which entails employing two or more independent flow channels and feeding two or more coolants having different temperatures to the independent flow channels to thereby cool the reaction vessel.

23 Claims, 4 Drawing Sheets

METHOD FOR CONTROLLING REACTION TEMPERATURE

FIELD OF THE INVENTION

The present invention relates to a method for controlling reaction temperature for a reaction vessel used for conducting an exothermic reaction. More particularly, this invention relates to a reaction temperature control method with which the cooling ability of a coolant can be efficiently utilized.

The reaction temperature control method which the present invention relates to is efficient especially when used for suspension polymerization for producing a vinyl chloride polymer.

BACKGROUND OF THE INVENTION

In cooling systems for reaction vessels in which an exothermic reaction is conducted, (1) a jacket, (2) a coil, (3) a reflux condenser, and (4) an external circulation cooler are generally used either alone or in combination of two or more thereof. Of these cooling systems, the systems employing a cooling device fitted to a reaction vessel, such as the jacket cooling system and the coil cooling system, are simpler than the system employing a so-called heat exchanger and are frequently used as a primary cooling system.

In order for such a jacket, coil, or the like (hereinafter collectively referred to as "jacket or the like") fitted to a reaction vessel and having a flow channel for a heat transfer medium for heating and/or cooling to function to remove heat of reaction according to need upon the passing of a heat transfer medium for cooling (hereinafter referred to as "coolant") through the flow channel to thereby control the reaction temperature, the jacket or the like should have a cooling ability sufficient for the heat generated.

For use for exothermic batch reactions, in which the rate of heat generation fluctuates with progress of the reaction, the jacket or the like is required to have a cooling ability sufficient to cope with an exothermic peak so as to stably control the reaction temperature.

However, the cooling system widely used in reaction vessels equipped with a jacket or the like in which water cooled with a cooling tower is employed as a coolant has the following problem. Since the temperature of the coolant is relatively high and fluctuates depending on seasons and atmospheric temperature and other conditions, the reactor should be operated under such conditions that the cooling ability of the cooling system is sufficiently high so as to be always capable of coping with an abrupt temperature change. Consequently, the ability of the cooling apparatus cannot be fully utilized.

A generally employed cooling system which is reduced in the fluctuation of coolant temperature is the technique of using a coolant forcibly cooled with a refrigerating machine or the like. However, this method also has the following drawbacks. The refrigerating equipment used therefor should have an ability sufficient to cope with an exothermic peak, i.e., an ability far higher than that necessary for stationary operation, resulting in an increased equipment cost. Moreover, since the operation of the refrigerating machine or the like necessitates an energy, e.g., electric power, use of this technique as the only cooling system is uneconomical.

On the other hand, in the batch-wise polymerization reaction of, e.g., vinyl chloride monomer or a mixture of vinyl chloride monomer and a monomer copolymerizable therewith (hereinafter collectively referred to as "vinyl chloride-based monomer"), the rate of heat generation (i.e., the load required for cooling) generally differs considerably among the initial, middle, and final stages of the reaction. In the case of a method employing a low-temperature coolant alone, the flow rate of the coolant should therefore be changed considerably with the progress of the reaction. However, too low a flow rate results in a reduced coefficient of heat transfer, and this results in a reduced cooling efficiency which is lower than that expected from the reduced coolant flow rate. When the coolant flow rate is increased so as to cope with this problem, the increased coolant flow rate may result in excessive cooling to lower the temperature of the contents in the reaction vessel. Thus, the control of reaction only by changing the flow rate of the coolant is difficult. In the case where the load required for cooling fluctuates considerably as in batch reactions, the cooling system necessitates a buffer tank having a large capacity so as to prevent the coolant from undergoing an abrupt change in temperature, and this results in an increased equipment cost.

SUMMARY OF THE INVENTION

An object of the present invention is to provide a method for efficiently utilizing the cooling ability of a coolant in an exothermic reaction, particularly to provide a reaction temperature control method which, when applied to a batch-wise exothermic reaction in which the load required for cooling fluctuates considerably with the lapse of time, shows a satisfactory energy efficiency and excellent reaction control and enables a high production efficiency. In particular, the object of the present invention is to provide a method for effectively controlling reaction temperature in a batch-wise polymerization reaction of a vinyl chloride-based monomer in an aqueous medium.

The essential aspects of the present invention reside in a method for controlling reaction temperature for a reaction vessel having a flow channel for a heat transfer medium for heating and/or cooling which comprises employing two or more independent flow channels and feeding two or more coolants having different temperatures to the independent flow channels to thereby cool the reaction vessel.

Description of the Symbols:
1 reaction vessel
2 reaction vessel jacket
2A, 2B independent coolant flow channel of the reaction vessel jacket 3
3 cooling tower
4 circulating pump for coolant H
5 circulating pump for coolant L
6 refrigerating machine
7 tank for coolant L
8 temperature control element
9 partition wall
10A, 10B inlet to independent coolant flow channel
11A, 11B outlet from independent coolant flow channel
12 equalizing pipe (pipe equalizing pressures between reaction zone and gap chamber)
13 gap chamber

DETAILED DESCRIPTION OF THE INVENTION

In the following detailed description of the invention, a cooling system employing two coolants having different temperatures is explained as an example, with the coolant having a higher temperature being referred to as "coolant H" and that having a lower temperature being referred to as "coolant L." However, also in the case of using three or more coolants, the following explanation applies to any two coolants having different temperatures.

The coolants for use in the present invention are not particularly limited, and can be selected from generally used collants. Examples thereof include water, aqueous calcium chloride solution, ethylene glycol (and aqueous solution thereof), methanol, ethanol, Freon, and kerosine. Of these, water is preferably used as at least one of the coolants because water is highly safe in handling and has a high heat capacity.

Examples of cooling methods for obtaining the coolants for use in the present invention include the aforementioned technique employing a cooling tower or a refrigerating machine and a technique of heat exchange with a medium having a lower temperature. In particular, use of a cooling tower is suitable for obtaining coolant H and use of a refrigerating machine is suitable for obtaining coolant L.

Examples of the type of flow channels for a heat transfer medium for heating and/or cooling in the reaction vessel for use in the present invention include the jacket type, coil type, and temperature control element type. Of these, flow channels of the jacket type and the temperature control element type are especially suitable for use in the method of this invention.

Examples of the jacket include an external jacket, which is in wide use, an internal jacket, and a semiround pipe jacket. Examples of the coil include a coiled pipe, a hairpin coil, and a plate coil. The temperature control element type flow channel wall (temperature control element) which comprises an inner plate, partition plates disposed apart from one another and perpendicularly to the external surface of the inner plate, and outer strips disposed so that each strip straddles the edges of two adjacent partition plates to form, between the inner plate and the outer strips, heat-transfer-medium flow channels partitioned by the partition plates, and which is fixed to the inner surface of a reaction vessel. Analogues of this flow channel wall are included in the temperature control element type flow channel.

For partitioning such a coolant flow channel of the jacket type or the like, the following techniques may be used. In the jacketed type or the temperature control element type, partition can be accomplished by suitably inserting partition plates into the flow channel and forming outlet and inlet nozzles for a coolant in each of the resulting independent channels. In the case of the coil type, partition can be accomplished, for example, by using a coil whose inside has been partitioned in the same manner as the above, or using two or more coils.

Especially preferred is a reaction vessel of the temperature control element type. This is because this element not only has an excellent efficiency of heat transfer but also is capable of being disposed so as to extend to a part corresponding to the bottom panel board of the reaction vessel. Namely, the temperature control element has a high cooling efficiency and the effect of the present invention can be fully exhibited with this element.

The number of independent channels formed by partitioning the coolant flow channel varies depending on the size of the reaction vessel, and is not particularly limited as long as the number is two or larger. For example, from two to about twenty independent flow channels are generally formed.

In the method of the present invention, the cooling of a reaction vessel having two or more independent coolant flow channels with the above-described two (or more) coolants may be carried out as follows. In the case where the quantity of heat which should be removed for maintaining a reaction temperature within a given range (hereinafter referred to as "the quantity of heat to be removed") is not larger than the quantity of heat which can be removed with coolant H (i.e., the cooling ability of coolant H), coolant H alone may be fed to all the independent flow channels to control the reaction temperature. In this case, if the independent flow channels consist of one or more channels exclusive to coolant L and one or more channels exclusive to coolant H, the flow rate of coolant H is regulated to control the reaction temperature while feeding coolant L at the minimum flow rate or without feeding coolant L. In the case where the quantity of heat to be removed exceeds the quantity of heat which can be removed with coolant H, coolant L is fed to part or all of the independent flow channels at a regulated flow rate to control the reaction temperature.

The control of reaction temperature can be accomplished by regulating the flow rates of the coolants. However, in the case where coolant H and coolant L are used in combination, it is economically advantageous to feed coolant H at the maximum flow rate, because this enables coolant H to exhibit its cooling ability effectively.

In the case where the cooling ability necessary for carrying out a reaction can be estimated beforehand, or in the case where a reaction vessel having many independent coolant flow channels is used, coolant L may be kept being fed to part of the independent flow channels from the beginning of the reaction.

Figure 1:
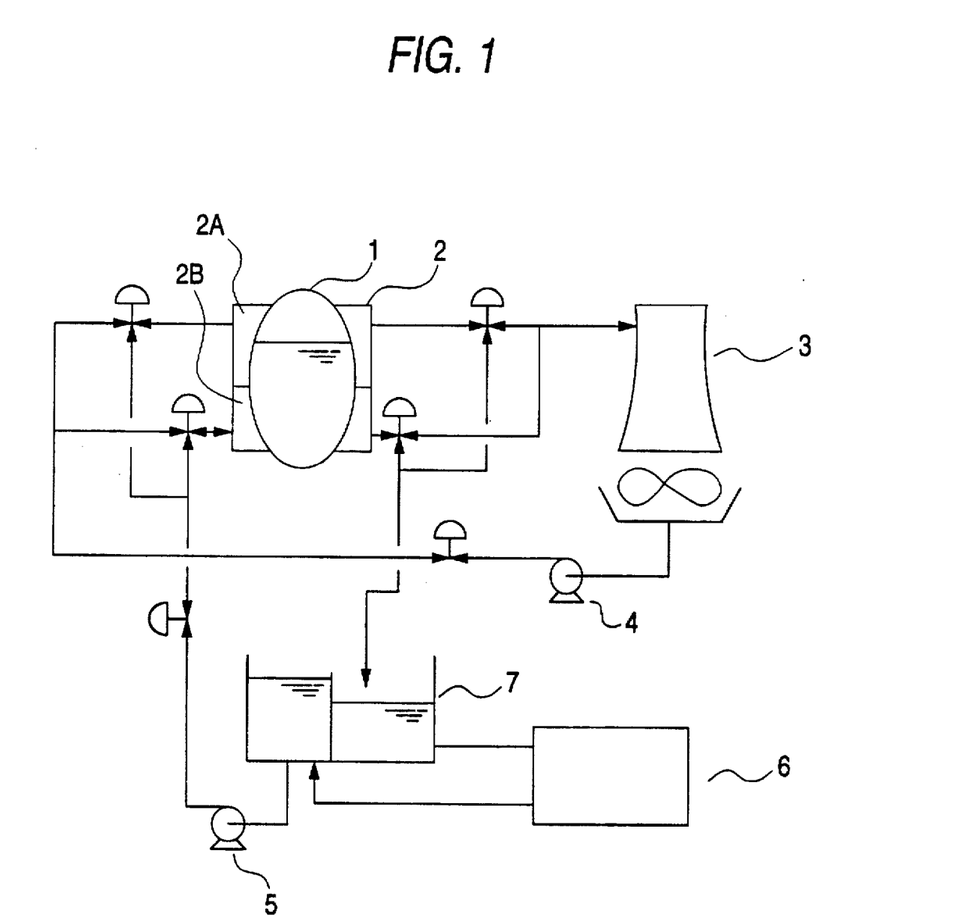
FIG. 1 is a flow diagram showing an example of a system usable for practicing the method of the present invention which comprises a reaction vessel having two independent coolant flow channels, a refrigerating machine, and a cooling tower and which employs two kinds of coolants to control reaction temperature.
Figure 2:
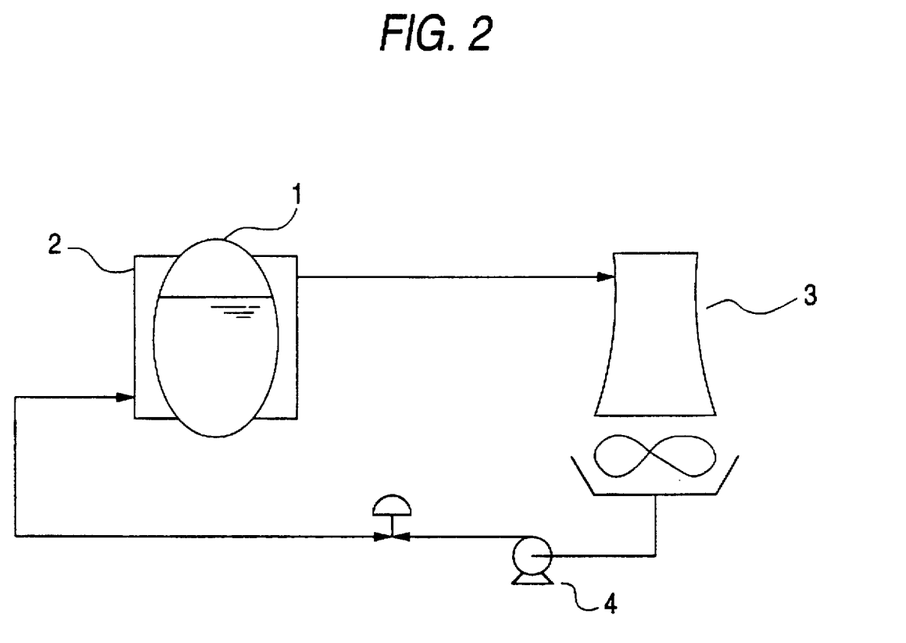
FIG. 2 is a flow diagram showing an example of a conventional reaction temperature control system consisting only of a reaction vessel equipped with a cooling jacket in which the flow channel has not been partitioned and of a cooling tower.

An example of a system usable in the method of the invention which comprises a reaction vessel having independent flow channels, a refrigerating machine, and a cooling tower is shown in FIG. 1, while an example of a conventional system consisting only of a reaction vessel in which the coolant flow channel has not been partitioned and of a cooling tower is shown in FIG. 2.

An embodiment of the method of the present invention applied to a batch reaction is explained below by reference to FIG. 1.

In the case where the rate of heat generation is low and hence the quantity of heat to be removed is not very large as in the initial stage of a reaction, or in the case where the temperature of coolant H obtained in a cooling tower 3 is low as in winter, coolant H may be fed to both of independent flow channels 2A and 2B at a regulated flow rate to cool the reaction vessel. If the independent flow channels consist of a channel exclusive to coolant L and a channel exclusive to coolant H, the flow rate of coolant H is regulated to control the reaction temperature while feeding coolant L at the minimum flow rate or without feeding coolant L, as described hereinabove.

In the case where the rate of heat generation and the quantity of heat to be removed have increased as a result of the progress of the reaction, or in the case where coolant H has a relatively high temperature and hence a reduced cooling ability as in summer, there is the possibility that the cooling ability of coolant H might be insufficient for the quantity of heat to be removed, even when coolant H is fed to both of the independent flow channels 2A and 2B at the maximum flow rate (i.e., even when all the cooling ability of coolant H is used). In this case, coolant L is fed to one of the independent flow channels at a regulated flow rate while feeding coolant H to the other flow channel at the maximum flow rate to thereby control the reaction temperature.

Furthermore, in the case where the rate of heat generation reaches a peak as in the final stage of a reaction, or in the case where the temperature of coolant H is high as in the daytime in summer, the cooling ability of the coolants may be insufficient even when cooling is performed by the method described above. In such a case, coolant L is fed to all the independent flow channels to cool the reaction vessel.

The larger the number of independent flow channels, the more accurately the temperature control can be conducted. However, each independent flow channel necessitates a coolant feed piping and an accompanying controller, resulting in an increased equipment cost. Therefore, it is generally preferred that the number of independent flow channels be from 2 to about 20 as stated hereinabove.

When reaction temperature control is accomplished by selecting the coolants fed to independent flow channels according to the quantity of heat to be removed and to the cooling ability of coolant H, the cooling ability of coolant H can be fully utilized and the energy required for obtaining coolant L can be minimized. Namely, as compared with the cooling system in which coolant H is used as the only coolant, the cooling system for use in the present invention is advantageous in that coolant H need not have an excessively high cooling ability and almost all the cooling ability of coolant H can be utilized.

The method of the present invention is more effective when applied to an exothermic reaction such as a batch-wise polymerization reaction, in particular to the batch-wise polymerization reaction of a vinyl chloride-based monomer.

Generally employed processes for the polymerization of a vinyl chloride-based monomer include bulk polymerization, suspension polymerization, emulsion polymerization, and microsuspension polymerization. The method of the present invention is especially suitable for use in the polymerization of a vinyl chloride-based monomer in an aqueous medium.

The polymerization of a vinyl chloride-based monomer in an aqueous medium is generally conducted after a homogenization treatment. In suspension polymerization, the homogenization treatment is performed in an aqueous medium containing a dispersant in the presence of an oil-soluble polymerization initiator. In emulsion polymerization, the homogenization treatment is performed in the presence of an emulsifying agent and a water-soluble polymerization initiator. In microsuspension polymerization, the homogenization treatment is performed in the presence of an emulsifying agent and an oil-soluble polymerization initiator.

Although the method of the present invention is effectively applicable to any of the above-described processes, the method is especially effective when applied to the suspension polymerization process. The reason for this is as follows. Since large reaction vessels having a capacity as large as, e.g., 40 m$^3$ or larger are widely used in the suspension polymerization process, a vinyl chloride-based monomer is introduced thereinto in a large amount and this results in an increased rate of heat generation. However, the increase in the area of heat transfer surface in the conventional reaction vessels is small for the increase in vessel capacity, so that the reaction vessels tend to have an insufficient cooling ability.

The vinyl chloride-based monomer used in the polymerization reaction to which the method of the present invention is applied is either vinyl chloride monomer alone or a mixture comprising vinyl chloride monomer as the main component and one or more monomers copolymerizable therewith. The monomers copolymerizable with vinyl chloride monomer are not particularly limited, and may be selected from monomers which have been generally used. Examples of such comonomers include vinyl esters such as vinyl acetate, vinyl propionate, and vinyl stearate; alkyl vinyl ethers such as methyl vinyl ether, ethyl vinyl ether, octyl vinyl ether, lauryl vinyl ether, and cetyl vinyl ether; α-olefins such as ethylene and propylene; monofunctional unsaturated acids such as acrylic acid and methacrylic acid; alkyl esters of these monofunctional unsaturated acids, such as methyl esters and ethyl esters; bifunctional unsaturated acids such as maleic acid, fumaric acid, and itaconic acid; alkyl esters of these bifunctional unsaturated acids, such as methyl esters and ethyl esters; vinylidene compounds such as vinylidene chloride; and unsaturated nitrites such as acrylonitrile. These comonomers may be used alone or as a mixture of two or more thereof. Although the amount of these comonomers is not particularly limited, it is usually up to 30% by weight, preferably up to 20% by weight, based on the amount of vinyl chloride monomer.

Dispersants generally used in the conventional suspension polymerization of vinyl chloride-based monomers may be used without particular limitation. Examples thereof include water-soluble polymers such as partially saponified poly (vinyl acetate) (so-called poly(vinyl alcohol)), cellulose derivatives, e.g., hydroxypropyl methyl cellulose, and gelatin. A dispersant aid may be used, such as an anionic surfactant, e.g., sodium lauryl sulfate, or a nonionic surfactant, e.g., a sorbitan/fatty acid ester or a glycerol/fatty acid ester. These dispersants or dispersant aids may be used alone or in combination of two or more thereof. The use amount of these dispersants is not particularly limited, and varies slightly depending on the kind thereof, intensity of stirring, polymerization temperature, kind of the comonomer(s) to be copolymerized with vinyl chloride monomer, monomer composition, desired particle diameter of the vinyl chloride polymer to be obtained, etc. In general, however, the dispersant amount is usually from 0.001 to 2% by weight, preferably from 0.03 to 1% by weight, based on the total amount of the vinyl chloride-based monomer.

Examples of the emulsifying agent used in the emulsion polymerization process and the microsuspension polymerization process include salts (alkali metal salts and ammonium salts) of higher alcohol/sulfuric acid esters, alkylbenzenesulfonic acid salts (alkali metal salts and ammonium salts), higher fatty acid salts (alkali metal salts and ammonium salts), and other anionic, nonionic, and/or cationic surfactants. These surfactants may be used alone or in combination of two or more thereof. The use amount of these emulsifying agents is not particularly limited, and is usually from 0.1 to 3% by weight (preferably from 0.3 to 1% by weight) based on the amount of the vinyl chloride-based monomer.

These emulsifying agents may be additionally used for the purpose of, e.g., regulating foamability during processing. In this case, the emulsifying agents may be added after completion of the polymerization reaction.

In the case where the method of the present invention is applied to the polymerization reaction of a vinyl chloride-based monomer, polymerization initiators generally used in conventional polymerization processes for vinyl chloride-based monomers may be used without particular limitations.

Examples of polymerization initiators for use in the suspension polymerization process include perester compounds such as t-butyl peroxypivalate, t-butyl peroxyneodecanoate, t-hexyl peroxypivalate, t-hexyl peroxyneodecanoate, and α-cumyl peroxyneodecanoate; diacyl or dialkyl peroxide compounds such as dilauroyl peroxide; percarbonate compounds such as diisopropyl peroxydicarbonate and di-2-ethylhexyl peroxydicarbonate; and azo compounds such as azobis(2,4-dimethylvaleronitrile) and azobisisobutyronitrile. These polymerization initiators may be used alone or in combination of two or more thereof. Although the use amount of these polymerization initiators varies depending on the kind thereof, polymerization temperature, desired reaction time, etc., it is generally from 0.01 to 1% by weight based on the total amount of the vinyl chloride-based monomer.

Examples of polymerization initiators for use in the emulsion polymerization process include water-soluble peroxides such as persulfates (e.g., sodium salt, potassium salt, and ammonium salt) and hydrogen peroxide; and water-soluble redox initiators consisting of a combination of these water-soluble peroxides and water-soluble reducing agents (e.g., sodium sulfite, sodium pyrosulfite, sodium hydrogen sulfite, ascorbic acid, and sodium formaldehydesulfoxylate).

Examples of polymerization initiators for use in the microsuspension polymerization process include monomer-soluble (oil-soluble) initiators such as azobisisobutyronitrile, azobis(2,4-dimethylvaleronitrile), lauroyl peroxide, and t-butyl peroxypivalate; and redox initiators consisting of a combination of these oil-soluble initiators and the water-soluble reducing agents enumerated above.

If desired and necessary, various polymerization aids for use in the polymerization of vinyl chloride-based monomers may be suitably added in the polymerization reaction in the present invention. Examples of such polymerization aids include a polymerization regulator (chain-transfer agent, crosslinking agent), an antioxidant, a pH regulator, and an activator for redox initiators. Conditions under which these ingredients are used, including the amount thereof, may be the same as the conditions commonly used in the conventional polymerization of vinyl chloride-based monomers.

Examples of the polymerization regulator for use in the polymerization of a vinyl chloride-based monomer include chain-transfer agents such as trichloroethylene, carbon tetrachloride, 2-mercaptoethanol, and octyl mercaptan; and crosslinking agents such as diallyl phthalate, triallyl isocyanurate, ethylene glycol diacrylate, and trimethylolpropane trimethacrylate.

In applying the method of the present invention to the polymerization reaction of a vinyl chloride-based monomer, there is no particular limitation on the introduction amounts of an aqueous medium, the vinyl chloride-based monomer, a polymerization initiator, a dispersant for suspension polymerization, an emulsifying agent for emulsion or microsuspension polymerization, and other various polymerization aids and on methods for introducing these ingredients into a reaction vessel (polymerization tank). For example, all of these ingredients may be introduced into the reaction vessel prior to initiation of the polymerization reaction. Alternatively, use may be made of a method in which part of these ingredients are introduced prior to initiation of the polymerization reaction and the remainder is introduced after initiation of the polymerization reaction either portionwise or continuously.

Polymerization temperature in the polymerization reaction of a vinyl chloride-based monomer to which reaction the method of the present invention is applied varies depending on the kind of the polymerization initiator used, polymerization method, presence of absence of a polymerization regulator, desired degree of polymerization, etc. In general, however, a polymerization temperature of from 0° to 90° C., especially from 40° to 70° C., is frequently used. The polymerization reaction may be carried out at a constant temperature, or the reaction temperature may be changed during the polymerization.

The reaction vessel to which the method of the present invention is applied may be equipped with an additional cooling device such as, e.g., a reflux condenser.

Embodiments of the method of the present invention will be explained below in detail by reference to Examples, but the invention should not be construed as being limited to the following Examples unless the spirit of the invention is departed from.

EXAMPLE 1

A reaction apparatus having the constitution shown in FIG. 1 was used which comprised a reaction vessel 1 having a capacity of 60 m$^3$, equipped with a stirrer, and having a cooling system comprising a cooling tower 3, a refrigerating machine 6, and a jacket having two independent coolant flow channels 2A and 2B to which coolant H (water cooled by a cooling tower) and coolant L (chilled water; water cooled by a refrigerator) respectively obtained with the cooling tower 3 and the refrigerating machine 6 were able to be fed. Into this reaction vessel were introduced 18 t of vinyl chloride monomer, 20 t of deionized water, partially saponified poly(vinyl acetate) as a dispersant, and t-butyl peroxypivalate as an initiator. The target reaction time (determined by the amount of the initiator) was set at 4 hours, and polymerization was carried out at a reaction temperature of 60° C.

Figure 3:
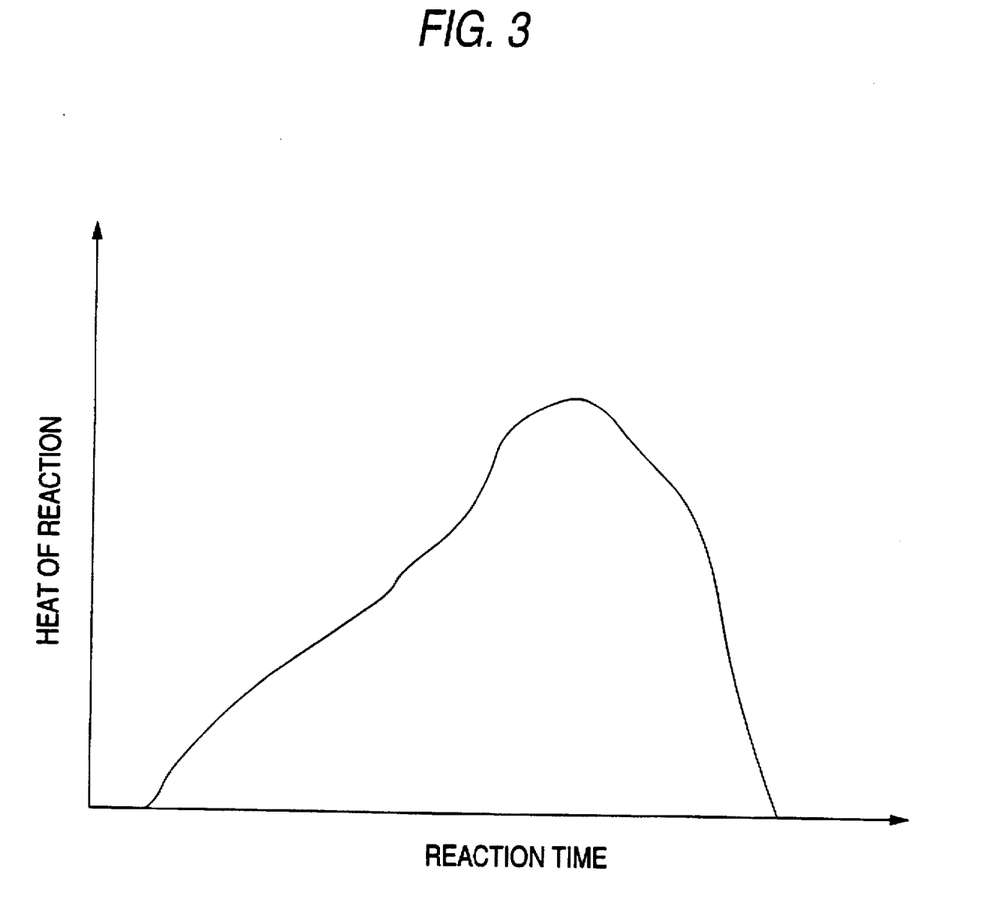
FIG. 3 is a drawing showing an example of the generation of heat of reaction in the batch-wise polymerization reaction of vinyl chloride.

The temperature of coolant H was 26.7° C. and that of coolant L was 5.0° C. The heat generation during the reaction is shown in FIG. 3.

Reaction control was possible with coolant H alone until the middle stage of the reaction. However, since the rate of heat generation began to increase at around 2 hours after initiation of the reaction, the feeding of coolant L cooled with the refrigerating machine 6 to the lower independent flow channel 2B was initiated and continued until completion of the reaction.

The time period from the time when the temperature of the contents in the reaction vessel reached the given polymerization reaction temperature to the time when the internal pressure of the reaction vessel decreased to a value lower by 2 kg/cm$^2$ than the saturated vapor pressure of vinyl chloride monomer at the reaction temperature and when the unreacted monomer began to be recovered was measured as the reaction time. The reaction time of this reaction was 3 hours and 55 minutes.

EXAMPLE 2

Polymerization reaction was carried out in the same manner as in Example 1, except that the polymerization initiator was used to set the target reaction time at 3 hours and 30 minutes, and that the feeding of coolant L to the lower independent flow channel 2B was initiated at the beginning of the reaction.

The reaction time was 3 hours and 35 minutes.

EXAMPLE 3

Polymerization reaction was carried out in the same manner as in Example 1, except that the polymerization initiator was used to set the target reaction time at 4 hours and 15 minutes, and that the feeding of coolant L to the lower independent flow channel 2B was initiated at 3 hours and 15 minutes after initiation of the reaction.

The reaction time was 4 hours and 10 minutes.

COMPARATIVE EXAMPLE 1

Polymerization was initiated in the same manner as in Example 1, except that the cooling system shown in FIG. 1 was modified so as to use coolant H alone (i.e., so as to have the constitution shown in FIG. 2), with the target reaction time being 4 hours.

The reaction could be satisfactorily controlled until the middle stage of the reaction. However, in the final stage of the reaction, the cooling ability became insufficient. Specifically, even when coolant H was circulated at the maximum flow rate, the temperature of the reaction system increased and exceeded 61° C., which was higher by 1° C. than the given reaction temperature. Therefore, the vinyl chloride monomer was recovered from the reaction vessel to terminate the reaction.

COMPARATIVE EXAMPLE 2

Polymerization reaction was initiated in the same manner as in Comparative Example 1, except that the polymerization initiator was used to set the target reaction time at 4 hours and 30 minutes.

The reaction could be controlled with coolant H alone throughout the whole reaction period. However, at the peak of heat generation in the final stage of the reaction, the flow rate of coolant H was maximum, showing that the insufficiency of cooling ability impended.

The reaction time was 4 hours and 35 minutes.

The results obtained above are summarized in Table 1.

EXAMPLE 4

A reaction apparatus was used which comprised a reaction vessel 1 having a capacity of 60 m$^3$, equipped with a stirrer, and having a cooling system comprising a jacket having ten independent coolant flow channels to each of which either of coolant H and coolant L was able to be fed.

The suspension polymerization of vinyl chloride was carried out in the same manner as in Example 1, except that the amount of the initiator was regulated so as to set the target reaction time at 4 hours and 15 minutes, and that coolant L and coolant H were continuously fed to one of the independent flow channels and the remaining nine independent flow channels, respectively, from the beginning to completion of the reaction.

The temperature of coolant H was 25.4° C. and that of coolant L was 5.0° C. The heat generation during the reaction was the same as in FIG. 3.

The reaction was completed satisfactorily, and the reaction time was 4 hours and 20 minutes.

EXAMPLE 5

Polymerization reaction was carried out in the same manner as in Example 4, except that the polymerization initiator was used to set the target reaction time at 3 hours and 45 minutes, and that coolant L and coolant H were fed to four independent flow channels and the remaining six independent flow channels, respectively, from the beginning of the reaction.

The reaction time was 3 hours and 45 minutes.

EXAMPLE 6

Polymerization reaction was carried out in the same manner as in Example 4, except that the polymerization initiator was used to set the target reaction time at 3 hours and 30 minutes, and that coolant L and coolant H were fed to five independent flow channels and the remaining five independent flow channels, respectively, from the beginning of the reaction.

The reaction time was 3 hours and 30 minutes.

COMPARATIVE EXAMPLE 3

Polymerization was carried out in the same manner as in Example 4, except that coolant H was fed to all the independent flow channels and the target reaction time was set at 4 hours and 30 minutes.

Although the flow rate of coolant H reached 96% of the maximum flow rate in the final stage of the reaction, the reaction could be conducted satisfactorily and stably.

The reaction time was 4 hours and 35 minutes.

EXAMPLE 7

Figure 4:
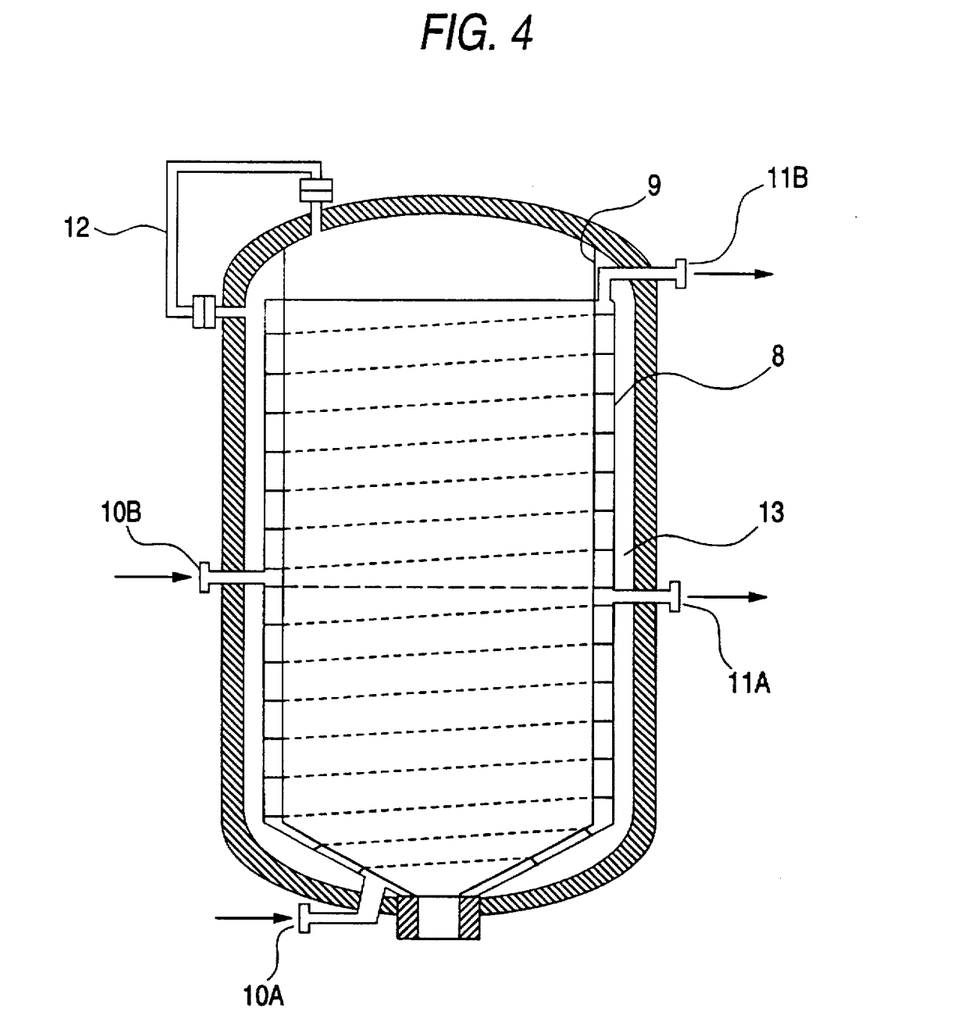
FIG. 4 is a sectional view showing a temperature control element type reaction vessel having two independent coolant flow channels and usable for practicing the present invention.

A reaction temperature control system having a cooling tower 3 and a refrigerating machine 6 was used which was the same as the system shown in FIG. 1, except that the reaction vessel was replaced with a temperature control element type reaction vessel with a capacity of 60 m$^3$ as shown in FIG. 4. This temperature control element type reaction vessel had twelve independent coolant flow channels, of which eight channels were exclusive to coolant H and four channels were exclusive to coolant L.

Vinyl chloride monomer and other ingredients were introduced into this reaction vessel in the same manner as in Example 1. The target reaction time was set at 3 hours and 30 minutes, and polymerization reaction was carried out at a reaction temperature of 60° C.

The reaction time was 3 hours and 25 minutes.

The temperature control element type reaction vessel showed a higher efficiency of heat transfer than the ordinary external-jacket type reaction vessel. As a result, the temperature control element type reaction vessel, in which the proportion of the flow channels for coolant L (the proportion of coolant L feed area) was 33%, attained the same production efficiency as in the external-jacket type reaction vessel in which the proportion of coolant L feed area was 50% (Example 6), when the reaction time for each reaction vessel was 3 hours and 30 minutes.

The results obtained above are summarized in Table 2.

TABLE 1

| | Reaction Time (hr:min) | | Independent Flow Channels* | | H→L Shift Timing | Production | Proportion of Coolant L |
|---|---|---|---|---|---|---|---|
| | Target Value | Measured Value | Upper | Lower | (hr:min) | Efficiency** | Feed Area (%) |
| Example 1 | 4:00 | 3:55 | H | shift | 2:00 | 117 | 24 |
| Example 2 | 3:30 | 3:35 | H | L | — | 128 | 50 |
| Example 3 | 4:15 | 4:10 | H | shift | 3:15 | 110 | 11 |
| Comparative Example 1 | 4:00 | Reaction was stopped | H | H | — | — | 0 |
| Comparative Example 2 | 4:30 | 4:35 | H | H | — | 100 | 0 |

*:
L ... coolant L
H ... coolant H
shift ... coolant feeding was shifted from coolant H to coolant L during reaction.
**: Production capacity per hour relative to the production capacity in Comparative Example 2 which was taken as 100. Each value of production efficiency was calculated as a ratio of the reciprocal of the reaction time.

TABLE 2

| | Reaction Time (hr:min) | | Independent Flow Channels* | | Proportion of Coolant L Feed Area (%) | Production Efficiency** |
|---|---|---|---|---|---|---|
| | Target Value | Measured Value | Coolant H | Coolant L | | |
| Example 4 | 4:15 | 4:20 | 9 | 1 | 10 | 106 |
| Example 5 | 3:45 | 3:45 | 6 | 4 | 40 | 122 |
| Example 6 | 3:30 | 3:30 | 5 | 5 | 50 | 131 |
| Comparative Example 3 | 4:30 | 4:35 | 10 | 0 | 0 | 100 |
| Example 7 | 3:30 | 3:25 | 8 | 4 | 33 | 131 |

*: The number of independent flow channels to which coolant H or coolant L was fed.
**: Production capacity per hour relative to the production capacity in Comparative Example 3 which was taken as 100. Each value of production efficiency was calculated as a ratio of the reciprocal of the reaction time.
***: In Example 7, a temperature control element type reaction vessel was used.

While the invention has been described in detail and with reference to specific embodiments thereof, it will be apparent to one skilled in the art that various changes and modifications can be made therein without departing from the spirit and scope thereof.

What is claimed is:

1. A method for controlling reaction temperature for a reaction vessel having a flow channel for a heat transfer medium for heating or cooling or both when vinyl chloride-based monomer is polymerized in an aqueous medium, which comprises employing two or more flow channels and feeding two or more coolants having different temperatures to said independent flow channels to thereby cool the reaction vessel.

2. The method as claimed in claim 1, wherein two coolants having different temperatures are used as said coolants in such a manner that coolant H alone is used when the quantity of heat which should be removed for maintaining a reaction temperature within a given range does not exceeds the cooling ability of said coolant H, and that coolant L is fed to part or all of said flow channels when said quantity of heat exceeds the cooling ability of said coolant H, wherein the coolant H represents the coolant having a higher temperature and the coolant L represents the coolant having a lower temperature.

3. The method as claimed in claim 1, wherein at least one of said coolants is water.

4. The method as claimed in claim 1, wherein the temperature of at least one of said coolants is lower than that of the water cooled by a cooling tower.

5. The method as claimed in claim 1, wherein the type of flow channels is jacket type.

6. The method as claimed in claim 1, wherein the type of flow channels is temperature control element type.

7. The method as claimed in claim 1, wherein the number of said independent flow channels is from 2 to 20.

8. The method as claimed in claim 1, wherein said vinyl chloride-based monomer is vinyl chloride or a mixture of vinyl chloride and a monomer copolymerizable therewith.

9. The method as claimed in claim 8, wherein said polymerization reaction is a batch-wise suspension polymerization reaction.

10. The method as claimed in claim 8, wherein said monomer copolymerizable with vinyl chloride is a vinyl ester, alkyl vinyl ether, α-olefin, monofunctional unsaturated acid, bifunctional unsaturated acid, alkyl ester of monofunctional or bifunctional unsaturated acid, vinylidene compound or unsaturated nitrile.

11. The method as claimed in claim 10, wherein said vinyl ester is vinyl acetate, vinyl propionate or vinyl stearate.

12. The method as claimed in claim 10, wherein said alkyl vinyl ether is methyl vinyl ether, ethyl vinyl ether, octyl vinyl ether, lauryl vinyl ether and cetyl vinyl ether.

13. The method as claimed in claim 10, wherein said α-olefin is ethylene or propylene.

14. The method as claimed in claim 10, wherein said monofunctional unsaturated acid is acrylic acid or methacrylic acid.

15. The method as claimed in claim 10, wherein said alkyl ester of monofunctional unsaturated acid is methyl- or ethyl ester of acrylic or methacrylic acid.

16. The method as claimed in claim 10, wherein said bifunctional unsaturated acid is maleic acid, fumaric acid or itaconic acid.

17. The method as claimed in claim 10, wherein said alkyl ester of bifunctional unsaturated acid is methyl- or ethyl ester of maleic acid, fumaric acid or itaconic acid.

18. The method as claimed in claim 10, wherein said vinylidene compound is vinylidene chloride.

19. The method as claimed in claim 10, wherein said unsaturated nitrile is acrylonitrile.

20. The method as claimed in claim 8, wherein said monomer copolymerizable with vinyl chloride is present in an amount of up to 30% by weight in said mixture.

21. The method as claimed in claim 1, wherein said polymerization is effected at a temperature of about 0° C. to 90° C.

22. The method as claimed in claim 21, wherein said polymerization is effected at a temperature of about 40° C. to 70° C.

23. The method as claimed in claim 1, wherein from 2 to 20 flow channels are employed.

* * * * *

UNITED STATES PATENT AND TRADEMARK OFFICE
CERTIFICATE OF CORRECTION

PATENT NO. : 5,756,602
DATED      : May 26, 1998
INVENTOR(S): Chi-Wai HUI, et al.

It is certified that error appears in the above-identified patent and that said Letters Patent is hereby corrected as shown below:

On the title page, in Item [75], the first inventor's name is incorrect. It should read:

-- Chi-Wai Hui --

Signed and Sealed this

First Day of December, 1998

Attest:

Attesting Officer

BRUCE LEHMAN
Commissioner of Patents and Trademarks